United States Patent [19]
Sekmakas

[11] 3,862,072
[45] Jan. 21, 1975

[54] THERMOSETTING AQUEOUS COATINGS CONTAINING BRANCHED HYDROXY FUNCTIONAL POLYESTER AND HYDROXY FUNCTIONAL POLYETHER OR POLYESTER ADDUCTS OF AN AT LEAST TRIFUNCTIONAL ALCOHOL

[75] Inventor: Kazys Sekmakas, Chicago, Ill.
[73] Assignee: DeSoto, Inc., Des Plaines, Ill.
[22] Filed: Oct. 23, 1973
[21] Appl. No.: 408,988

Related U.S. Application Data
[63] Continuation-in-part of Ser. No. 307,099, Nov. 16, 1972.

[52] U.S. Cl. ... 260/29.4 R, 117/132 B, 117/132 BF, 117/161 K, 117/161 LN, 117/161 UC, 260/29.2 E, 260/29.2 EP, 260/842, 260/850, 260/860
[51] Int. Cl. .................. C08g 37/34, C08g 51/24
[58] Field of Search ... 260/29.2 E, 29.2 EP, 29.4 R, 260/29.4 UA, 29.6 NR, 29.6 TA, 75 R, 842, 850, 860

[56] References Cited
UNITED STATES PATENTS

| | | |
|---|---|---|
| 3,102,868 | 9/1963 | Bolton et al. ..................... 260/45.3 |
| 3,274,292 | 9/1966 | Joo et al. ....................... 260/75 S X |
| 3,310,512 | 3/1967 | Curtice .......................... 260/29.4 R |
| 3,352,827 | 11/1967 | Sekmakas ........................... 260/834 |
| 3,437,618 | 4/1969 | Taft .............................. 260/29.4 R |
| 3,624,013 | 11/1971 | Sekmakas et al. .......... 260/29.4 UA |
| 3,631,136 | 12/1971 | Spiller ...................... 260/29.2 E X |

Primary Examiner—Melvin Goldstein
Assistant Examiner—W. C. Danison
Attorney, Agent, or Firm—Dressler, Goldsmith, Clement & Gordon, Ltd.

[57] ABSTRACT

Thermosetting aqueous coatings are provided containing hydroxy functional polyesters based on tricarboxylic acids, such as trimellitic anhydride, reacted with excess diol to an acid number in the range of 45–60, formaldehyde condensates, and from 5–40%, based on total resin solids, of a polyether or polyester adduct of an at least trifunctional alcohol having a molecular weight of at least about 300. The polyether or polyester adduct lowers viscosity at high solids content while minimizing the need for volatile cosolvents, and it participates in the cure to increase the flexibility and impact resistance of the cured coating.

16 Claims, No Drawings

THERMOSETTING AQUEOUS COATINGS CONTAINING BRANCHED HYDROXY FUNCTIONAL POLYESTER AND HYDROXY FUNCTIONAL POLYETHER OR POLYESTER ADDUCTS OF AN AT LEAST TRIFUNCTIONAL ALCOHOL

The present application is a continuation-in-part of my prior application Ser. No. 307,099, filed Nov. 16, 1972.

The present invention relates to thermosetting aqueous coatings which have been modified to possess increased solids content at lower solution viscosity while minimizing the presence of volatile cosolvent and improving the flexibility and impact resistance of the cured coatings.

In this invention a highly branched hydroxy functional acidic polyester is formed by using a tricarboxylic acid (preferably in the form of a monoanhydride) to provide at least 70% of the acidic functionality and by using diols to supply an excess of hydroxy functionality with polyesterification being continued until the acid number is in the range of 45-60. This polyester is dispersed in water with the aid of a base and a volatile water miscible organic solvent and a water soluble or dispersible formaldehyde condensate is incorporated in the aqueous medium together with certain high molecular weight polyether or polyester adducts having at least 3 hydroxy groups in an amount of from 5-40%, based on total resin solids. It has been found that the presence of the high molecular weight polyether adducts in the defined thermosetting aqueous coatings significantly changes the characteristics of the system to reduce the viscosity and the proportion of volatile solvent which is needed. Further, by participating in the curing reaction through hydroxy functionality, the polyether or polyester adducts add significant flexibility and impact resistance to the cured coatings. Also, the coatings exhibit improved flow properties on baking, overcoming cratering and like surface nonuniformities so that extraneous flow control agents can be omitted and foaming tendencies are also reduced.

The polyesters which are used in this invention are essentially free of oil or oil fatty acid, highly branched, and hydroxy functional. As is well known, a polyester can be formed by the polyesterification reaction of polycarboxylic acids with polyalcohols. In this invention, the polyalcohol consists essentially of diol and the polycarboxylic acids are essentially tricarboxylic. Thus, these oil free polyesters do not resemble alkyd resins which are oil-modified systems including a proportion of polyol containing more than two hydroxyl groups, such as glycerin.

Referring first to the polycarboxylic acids, at least about 70% of the total carboxyl functionality must be supplied by a tricarboxylic acid component, preferably employed in the form of a monoanhydride. Trimellitic acid can be used, but trimellitic anhydride is preferred. Another tricarboxylic acid monoanhydride which can be used is alpha-(2-carboxyethyl)-glutaric anhydride. Preferably, at least about 80% of the total carboxyl functionality is supplied by the tricarboxylic acid component. The high proportion of trifunctional acid produces extensive branching in a water-dispersible structure of adequate molecular weight.

With such extensive branching accruing from the acid component, it is necessary that the polyalcohol component consist essentially of diol in order to avoid premature gelation of the polyester. Oil or oil fatty acid are essentially absent since these are inconsistent with the high performance film characteristics and the extensive water dispersibility which are desired herein to form the concentrated aqueous coatings which are intended to possess a total solids content of at least 55%, preferably at least 60% by weight, while still being of low solution viscosity permitting easy coating of thin films.

The diol is preferably a glycol, e.g., the hydroxy groups are carried by terminal carbon atoms in the aliphatic carbon chain. The "neo" structure which denotes the presence of a tertiary carbon atom is especially preferred to provide coatings of outstanding characteristics. Thus, while any diol such as ethylene glycol, propylene glycol, butylene glycol, diethylene glycol, or the like may be used, a "neo" structure as is present in the commercial ester diol 204 is particularly preferred. This diol has the formula:

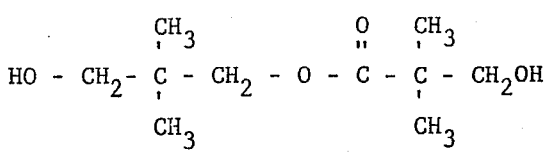

The acid component may include a minor proportion of saturated dicarboxylic acids, the term "saturated" here including aromatic unsaturation as in phthalic acid or anhydride, iso- or tere-phthalic acids. Adipic or succinic acids will illustrate the aliphatic diacids.

Monofunctional reactants are largely excluded since these are lower molecular weight.

The components which are subjected to polyesterification in one or more stages must include an excess of hydroxy functionality. On an equivalent basis, there should be at least 1.1 up to about 2 hydroxy equivalents per equivalent of carboxy. A ratio of from 1.2:1 to 1.6:1 being preferred, with best results at a ratio of 1.25:1 to 1.4:1.

The polyesterification reaction is itself entirely conventional, except from the standpoint that the final acid number must be less than about 60. Since the copolyester will gel at an acid number of about 45, it will be apparent that the copolyesters of interest herein must possess a narrow range of acidity of from about 45 to about 60. At higher acidity, the resinification of the polyester is inadequate to provide the rapid curing and outstanding film characteristics which are desired.

The hydroxy functional polyester so-provided can be dispersed at high solids content in aqueous medium with the aid of a base and a volatile organic solvent, such as methyl ethyl ketone, 2-ethoxy ethanol, 2-butoxy ethanol, dioxane, or other similar water-miscible organic solvent. These volatilize during the bake and are, therefore, objectionable. It is presently desired to minimize the volatile solvent content of the coating by having at least 80 parts of water for every 20 parts of volatile solvent and by making the coating composition as concentrated as possible. This is quite difficult in the absence of this invention.

The base used to form a salt with the unconsumed carboxyl functionality in the polyester can be any base, but volatile nitrogenous bases such as ammonia or an amine, such as triethyl amine, are preferred. These are well known and entirely conventional. Neutralization of the resin may be partial or complete and the final aqueous composition may have a pH in the range of 6–11, preferably 7.5–10.5. Again, this is a conventional factor based on the use of bases to disperse acidic resins in water.

The aqueous composition containing the dispersed polyester has incorporated therein from 5–40%, preferably 10–30%, based on the total weight of resin, of a heat-hardening formaldehyde condensate, which can be dispersed in the aqueous medium. These constitute a well known class primarily constituted by aminoplasts such as urea-formaldehyde, hexamethoxy methyl melamine, and water dispersible transethers thereof with ethanol or other lower alcohol, benzoguanamine-formaldehyde and the like, including acidic derivatives where the carboxyl group assists solubilization in aqueous alkaline medium. Water soluble or dispersible phenol-formaldehyde condensates are also useful, such as "A" stage resols. These formaldehyde condensates can be used alone or in any desired mixture.

From the standpoint of the final aqueous solution, the total solids content should be at least about 55%, preferably at least about 60%. These total solids will include the polyester, the formaldehyde condensate, the polyether or polyester adducts described hereinafter, and any desired pigmentation.

The polyether adducts used in this invention are adducts of ethylene oxide or 1,2-propylene oxide with an aliphatic polyhydric alcohol containing at least three hydroxyl groups such as glycerin, sorbitol or the like. Preferably, the alcohol groups are present in the form of a plurality of methylol groups as in the compounds trimethylol propane and pentaerythritol which are particularly preferred. Propylene oxide is the preferred oxide.

The polyether adducts thus contain a plurality of hydroxy groups and are water dispersible compounds having a molecular weight of at least about 300, preferably at least about 400 up to about 5,000, preferably less than about 3,000. A full thermosetting cure generally requires a baking temperature of about 300°F., and the polyether adduct must be poorly volatile at such temperature in order to remain in the film to control flow and participate in the cure. At the same time, these hydroxy functional polyethers function as a cosolvent in the aqueous composition, lowering viscosity at high solids content and reducing the amount of volatile solvent which is needed to maintain the ratio of volatile solvent low, e.g., less than about 20 parts of solvent per 80 parts of water, preferably less than about 10 parts of solvent per 90 parts of water.

The baking temperature will range depending on the time available. At an oven temperature of about 350°F., 30 minutes is quite satisfactory. At lower temperatures of about 300°F. up to about 2 hours may be needed. At temperatures of about 550°–625°F., only 10–45 seconds are needed.

Importantly, the polyether adducts participate in the cure, become a permanent part of the cured coatings, and significantly benefit the flexibility and impact resistance which is obtained. With tetrafunctional polyols such as pentaerythritol, film hardness is also benefitted.

In addition to the polyether adducts described above, polyester adducts of the same molecular weight range can also be used, these being provided by the adduction of a lactone, such as epsilon-caprolactone, with the same aliphatic polyhydric alcohols containing at least 3 carbon atoms noted hereinbefore. It is found that the polyester adducts produce thermosetting coatings which possess superior color and color retention and which also provide better corrosion resistance and better resistance to water.

The lactone-based polyesters are in commerce and are usually based on epsilon-caprolactone which has the formula:

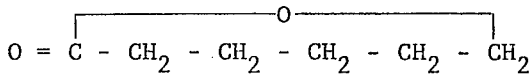

These lactones are reacted with polyhydric alcohols in known fashion to form adducts having the formula:

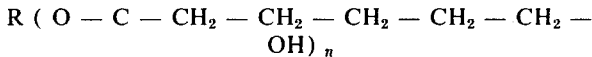

where R is the residue of an aliphatic polyhydric alcohol, preferably glycerin, pentaerythritol, trimethylol propane, or the like, and n is at least 3, preferably 3 or 4.

Other lactones which may be used are illustrated by butyrolactone, gamma-valerolactone, beta-propiolactone, and the like. Thus, and while epsilon-caprolactone is preferred, $C_3 - C_{14}$ lactones generally are useful.

The invention is illustrated in the examples which follow, in which all parts are by weight, unless otherwise specified.

EXAMPLE 1

Parts by Weight 1.
1,200 Diethylene Glycol
950 Trimellitic Anhydride
230 Phthalic Anhydride
2 Dibutyl Tin Oxide Catalyst
50 Xylol (reflux solvent)
Set trap with xylol. Heat to 210°C. and collect water. When acid value of 95 is reached, decrease temperature to 180°C. Hold for acid value of 53–56 at 180°–190°C. Total water collected, 180 grams. Remove trap, blow off xylol.
2. 733 Tetrol - molecular weight 405 (see Note 1)
3. 733 Hexamethoxy methyl melamine
4. 733 2-Ethoxy Ethanol
5. 2933 Deionized Water
6. 160 Dimethyl Ethanol Amine.
Add reactive solvent 2. Cool to 80°C. and add water soluble melamine 3, and solvent 4, water 5, and amine 6.
Final Characteristics
Solids: 49.1%
Gardner Viscosity: J-K
Color (Gardner Holdt) 1

Ratio of Resin Solids:

| | |
|---|---|
| Water Soluble Polyester: | 60% |
| Reactive Polyol: | 20% |
| Hexamethoxy Methyl Malamine: | 20% |
| Ratio of Volatile Solvents: | |
| Deionized Water: | 80% |
| 2-Ethoxy Ethanol: | 20% |

Note 1
Polyoxypropylene derivative of pentaerythritol. Molecular weight: 405; Basic Functionality: 4; Hydroxy Number: 555, Viscosity: 2200 centipoises at 25°C.

EXAMPLE 2

Example 1 was repeated, only the Tetrol having a molecular weight of 405 was replaced with the following triol having a molecular weight of 2,540:

A liquid triol (polyoxypropylene derivative of trimethylol propane) having a molecular weight of 2,540, a functionality of 3, and an hydroxyl number of 64.

Excellent properties of the coating were also obtained.

EXAMPLE 3

Example 1 was repeated, only the reactive solvent was omitted from the reaction ingredients.

The resins of Examples 2 and 3 were evaluated in clear coatings on steel. The following results were obtained when coating was applied by a Bird applicator onto zinc phosphate treated steel panels to deposit a wet coating having a thickness of 3 mils and the coated steel panels were baked in an electric oven at 350°F. for 20 minutes.

| Properties | Example 2 | Example 3 |
| --- | --- | --- |
| Hardness (pencil) | 4H | 4H |
| Impact (Forward 80 inch/lb.) | Pass | Fail |
| Impact (Reverse 60 inch/lb.) | Pass | Fail |
| Flexibility (¼ inch Mandrel) | Pass | Fail |
| Solvent Resistance (50 methyl ethyl ketone rubs) | Pass | Pass |

EXAMPLE 4

Parts by Weight 1.
240 Neopentyl Glycol
1070 2,2-Dimethyl-3-hydroxypropyl-2,2-Dimethyl-3-Hydroxypropionate (see the structure of Ester Diol 204 presented hereinbefore)
175 Isophthalic Acid
650 Trimellitic Anhydride
2 Dibutyl Tin Oxide (catalyst)
50 Xylol (reflux solvent)
Set trap with xylol. Heat to 210°C. and collect water in trap. When 110 grams of water are collected, cool to 190°C. and hold for a final acid value of 50–53. Total water collected, 135 grams. Remove trap and blow off xylol using nitrogen sparge.
2. 909 Tetrol (molecular weight 594 - see Note 2)
3. 727 Hexamethoxy Methyl Melamine
4. 727 2-Ethoxy Ethanol
5. 160 Dimethyl Ethanol Amine
6. 2909 Deionized Water
Add reactive solvent 2 and cool to 80°C. Add water soluble melamine 3, solvent 4, amine 5, and water 6.

| Final Characteristics | |
| --- | --- |
| Solids (percent) | 48.9 |
| Gardner viscosity | $Z_1 - Z_2$ |
| Color (Gardner-Holdt) | 1-2 |

Note 2
Polyoxypropylene derivative of pentaerythritol, molecular weight: 594; functionality: 4; hydroxyl number: 378; and viscosity: 1200 centipoises at 25°C.

| Ratio of Resin Solids: | |
| --- | --- |
| Water Soluble Polyester: | 55% |
| Reactive Polyol Solvent | 25% |
| Hexamethoxymethyl Melamine (Cross-linking agent) | 20% |
| Ratio of Volatile Solvents: | |
| Deionized Water | 80% |
| 2-Ethoxy Ethanol | 20% |

Evaluation of Example 4 Resin

A white pigmented coating was prepared by dispersing titanium dioxide pigment in the Example 4 resin solution utilizing high speed mixing.

The final characteristics of the white coatings were:
Pigment (titanium dioxide) ratio to resin solids: 1:1
Viscosity (No. 4 Ford Cup) 61 seconds
Total solids: 59.5%

The following results were obtained, when the coating was applied by a Bird applicator onto zinc phosphate treated steel panels to deposit a wet coating having a thickness of about 3 mils and the coated panels were baked at 300°F. for 20 minutes in an electric oven.

| Properties | Example 4 |
| --- | --- |
| Gloss (photovolt 60°) | 93 |
| Pencil hardness | 6H |
| Impact (forward 80 inch/lb.) | Pass |
| Impact (reverse 40 inch/lb.) | Pass |
| Flexibility (⅛ inch Mandrel) | Pass |
| Solvent Resistance (50 methyl ethyl ketone rubs) | Pass |
| Stain resistance to mustard, lipstick, and cottonseed oil | Excellent |

EXAMPLE 5

Example 4 is repeated except that the Tetrol defined in Note 2 is replaced on an equi-weight basis by the following caprolactone triol:
Functionality: 3
Melting Point, °C.: 27-32
Hydroxyl Number: 187
Viscosity at 40°C.: 560 centistokes
Specific Gravity at 40°C.: 1.084

Approximately the same results reported in Example 4 are obtained except that the hardness was not quite as great, and the coatings possess superior resistance to yellowing, particularly on overbake.

In place of the caprolactone triol notes above, a commercially available product NIAX Carpolactone Polyol PCP-0310 (Trademark) may be used. This product is available from Union Carbide Chemicals Company, New York, N.Y.

The invention is defined in the claims which follow.
I claim:
1. Thermosetting aqueous coating composition having a total solids content of at least about 55% and comprising an aqueous medium containing at least 80 parts of water for every 20 parts of water-miscible volatile organic solvent and having dispersed therein:
   1. essentially oil-free, non-gelled hydroxy functional acidic polyester formed by polyesterifying a polycarboxylic acid component, of which tricarboxylic acid or anhydride thereof selected from trimellitic of alpha-(2-carboxyethyl)-glutaric provides at least 70% of the acidic functionality, the balance being saturated dicarboxylic acid or anhydride, with a stoichiometric excess of a polyalcohol component consisting essentially of aliphatic diol, said polyalcohol component providing from 1.1 up to about 2 hydroxy equivalents per equivalent of carboxy in said polycarboxylic acid component, said polyester having an acid number in the range of from about 45 to about 60 and being dispersed in the aqueous medium with the aid of a base;
2. from 5% – 40%, based on total resin solids, of heat-hardening formaldehyde condensate dispersible in the aqueous medium and selected from aminoplasts and phenol-formaldehyde condensates; and
3. polyether or polyester adduct of ethylene oxide, 1,2-propylene oxide, or a lactone containing 3-14 carbon atoms with aliphatic polyhydric alcohol containing at least three hydroxyl groups, said adduct having a molecular weight in the range of from about 300 up to about 5000, said adduct being present in the aqueous medium in an amount of from 5% – 40%, based on total resin solids.

2. A coating composition as recited in claim 1 in which said tricarboxylic acid component is a monoanhydride used in an amount to provide at least 80% of the acidic functionality.

3. A coating composition as recited in claim 1 in which said tricarboxylic acid component is trimellitic anhydride.

4. A coating composition as recited in claim 1 in which said diol is a glycol.

5. A coating composition as recited in claim 3 in which said diol is 2,2-dimethyl-3-hydroxypropyl-2,2-dimethyl-3-hydroxy propionate and said formaldehyde condensate is an aminoplast resin.

6. A coating composition as recited in claim 1 in which said polycarboxylic acid component includes a minor proportion of saturated dicarboxylic acid.

7. A coating composition as recited in claim 1 in which the ratio of hydroxy equivalents to carboxy equivalents is in the range of 1.2:1 to 1.6:1.

8. A coating composition as recited in claim 1 in which said tricarboxylic acid is trimellitic anhydride and the ratio of hydroxy equivalents to carboxyl equivalents is in the range of 1.25:1 to 1.4:1.

9. A coating composition as recited in claim 1 in which the total solids content of said coating composition is at least about 60%, and there are at least 90 parts of water for every 10 parts of volatile organic solvent.

10. A coating composition as recited in claim 9 in which said base is a volatile nitrogenous base and the coating composition has a pH in the range of 6-11.

11. A coating composition as recited in claim 1 in which said heat-hardening formaldehyde condensate is an aminoplast resin present in an amount of from 10% – 30%, and said polyether adduct has a molecular weight less than about 3,000.

12. A coating composition as recited in claim 1 in which said polyether adduct is an adduct of 1,2-propylene oxide with an aliphatic polyhydric alcohol containing 3 or 4 hydroxyl groups.

13. A coating composition as recited in claim 1 in which said polyester adduct is an adduct of caprolactone with an aliphatic polyhydric alcohol containing 3 or 4 hydroxyl groups.

14. A coating composition as recited in claim 1 in which said adduct has a molecular weight in the range of about 400 to about 3,000.

15. Thermosetting aqueous coating composition having a total solids content of at least about 55% and comprising an aqueous medium containing at least 80 parts of water for every 20 parts of water-miscible volative organic solvent and having dispersed therein;
1. essentially oil-free, non-gelled, hydroxy functional acidic polyester formed by polyesterifying trimellitic anhydride with 2,2-dimethyl-3-hydroxypropyl-2,2-dimethyl-3-hydroxy propionate in stoichiometric excess, these components being the essential components of the polyester, and being used in proportions providing from 1.1 up to about 2 hydroxy equivalents per equivalent of carboxy in said polyester, said polyester having an acid number in the range of from about 45 to about 60 and being dispersed in the aqueous medium with the aid of a base;
2. from 5% – 40%, based on total resin solids, of heat-hardening aminoplast resin; and
3. polyether or polyester adduct of ethylene oxide, 1,2-propylene oxide, or a lactone containing 3-14 carbon atoms with aliphatic polyhydric alcohol containing three or four hydroxy groups, said adduct having a molecular weight in the range of from about 300 up to about 5,000, said adduct being present in the aqueous medium in an amount of from 5% – 40%, based on total resin solids.

16. A coating composition as recited in claim 15 in which the ratio of hydroxy equivalents to carboxy equivalents is in the range of 1.2;1 to 1.6:1 and said adduct is a polyether adduct of 1,2-propylene oxide with an aliphatic polyhydric alcohol containing 3 or 4 hydroxy groups.

* * * * *

UNITED STATES PATENT OFFICE
CERTIFICATE OF CORRECTION

Patent No. 3,862,072         Dated Jan. 21, 1975

Inventor(s) Kazys Sekmakas

It is certified that error appears in the above-identified patent and that said Letters Patent are hereby corrected as shown below:

Column 2, line 32, before "lower", delete "are".

Column 6, last line, change "of" to --or--.

Signed and sealed this 1st day of April 1975.

(SEAL)
Attest:

RUTH C. MASON
Attesting Officer

C. MARSHALL DANN
Commissioner of Patents
and Trademarks